Patented Apr. 28, 1953

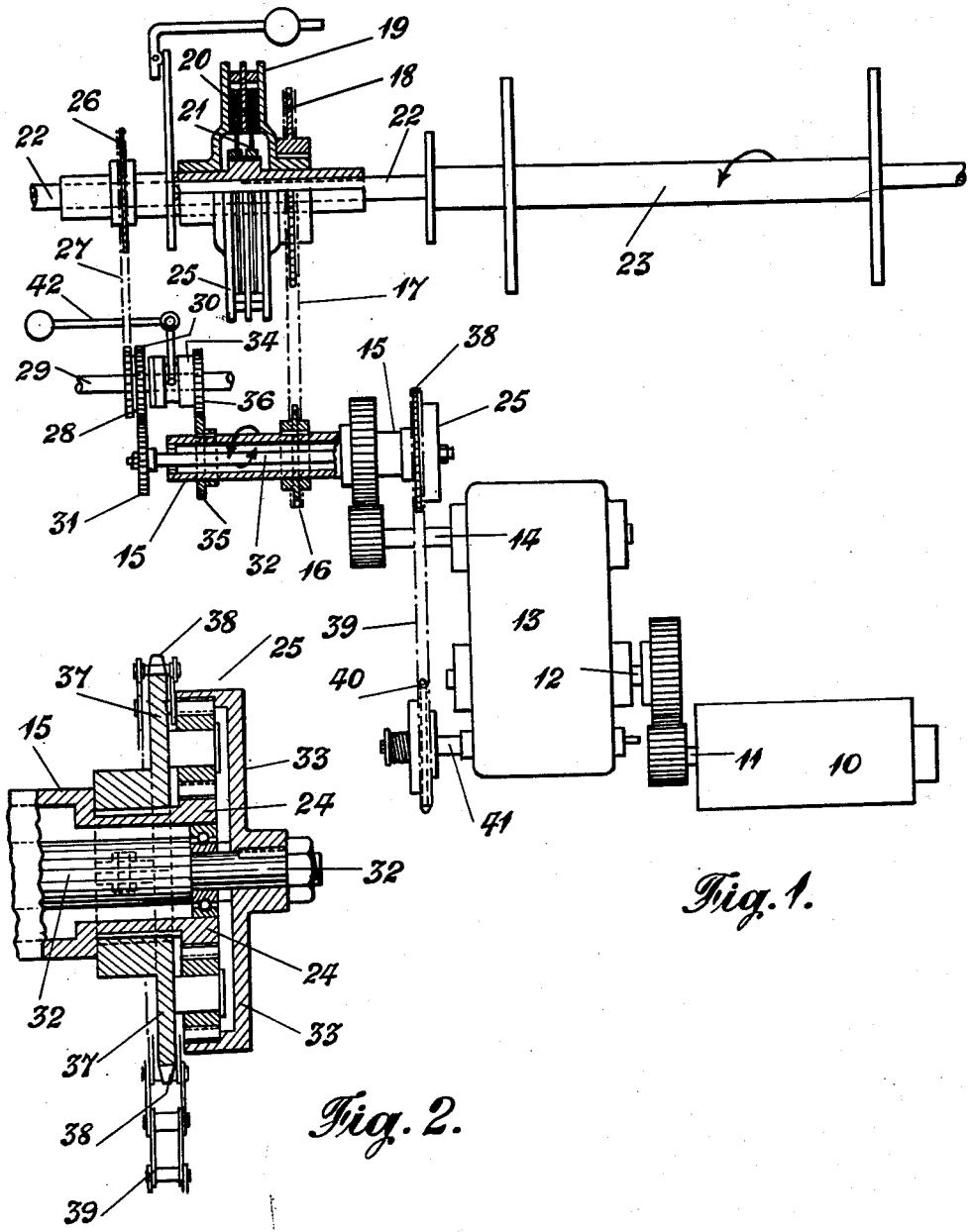

2,636,249

UNITED STATES PATENT OFFICE 2,636,249

VARIABLE-SPEED DRIVING MECHANISM FOR BEAMING MACHINES AND LIKE TEXTILE MACHINES

George Lee, Darwen, England

Application December 21, 1950, Serial No. 202,007
In Great Britain September 27, 1949

3 Claims. (Cl. 28—36)

This invention of improvements in variable speed driving mechanism for beaming machines and like textile machines refers to such machines in which yarn or thread is being drawn from one body and wound on to a further body, and in which the machine is driven by means of a friction clutch drive from an electromotor through variable gearing.

The invention has for its object the provision of variable speed driving mechanism which ensures that the tension on yarn or thread being wound is maintained constant irrespective of the variation in the lineal speed of the yarn or thread due to the increase in diameter of the beam or other body as the yarn or thread is being wound.

Variable speed driving mechanism according to the invention includes an electromotor geared to the input shaft of a variable speed drive, the output shaft of which is geared to a hollow shaft mounted adjacent to the gear box and in operative association through chain and sprocket mechanism with the driving member of a friction clutch, the driven member of which is fast on the driving shaft of the beaming machine, said hollow shaft having fast thereon the sun wheel of an epicyclic gear train, the revolutions of which are directly related to the revolutions of the driving side of said friction clutch, a chain and sprocket connection between the driven side of the friction clutch and a countershaft furnished with a friction clutch coupling driven by said hollow shaft through equal sized gear wheels, a gear wheel fast with the sprocket on said countershaft enmeshed with an equal sized gear wheel fast on one end of a centre shaft journalled in the aforesaid hollow shaft, the opposite end of said centre shaft having fast thereon the annulus of the aforesaid epicyclic train, a chain and sprocket connection between the planet wheel carrier of the epicyclic gear train and the control screw of the variable speed drive, and means for moving the aforesaid friction clutch and friction clutch coupling, respectively into and out of operation.

The invention will now be described with the aid of the accompanying drawings, which illustrate dagrammatically an embodiment of the invention as applied to a beaming machine.

In the drawings, Fig. 1 is a diagrammatic representation of an embodiment of variable speed driving mechanism according to the invention, the view being partly sectional; Fig. 2 is a fragmentary sectional view, drawn to a larger scale, of a detail part of Fig. 1 later to be described.

The same reference characters indicate corresponding parts in both figures of the drawings.

Variable speed driving mechanism according to the invention illustrated in the drawings includes an electromotor 10, the rotor shaft 11 of which is geared to the input shaft 12 of a variable speed drive 13, the output shaft 14 of which is geared to a hollow shaft 15 mounted adjacent to the gear box. Fast on said hollow shaft 15 is a sprocket wheel 16 wrapped by a chain 17 which also wraps a further and larger sprocket wheel 18 on the driving member 19 of a friction clutch 20, the driven member 21 of which is fast on the driving shaft 22 of the beam 23.

Fast on the hollow shaft 15 is the sun wheel 24 (Fig. 2) of an epicyclic gear train 25, the revolutions of the sun gear 24 being directly related with the revolutions of the driving side of the friction clutch 20.

On the driven side of the friction clutch 20 and running at the same speed as the beam 23 is a sprocket wheel 26 wrapped by a chain 27 which also wraps a further and smaller sprocket wheel 28 on the counter-shaft 29. Fast with the last-mentioned sprocket 28 is a gear wheel 30 entrained with a further gear wheel 31 of equal size fast on one end of a centre shaft 32 journalled in the aforesaid hollow shaft 15, whereby the centre shaft 32 is driven in reverse direction to the hollow shaft 15, the said centre shaft 32 having fast on its opposite end the annulus 33 (Fig. 2) of the epicyclic train 25.

A friction clutch coupling 34 on the countershaft 29 is driven by the hollow shaft 15 through equal sized gear wheels 35, 36.

The planet wheel carrier 37 (Fig. 2) of the epicyclic gear train is furnished with a sprocket 38 wrapped by a chain 39 which also wraps a sprocket wheel 40 on the control screw 41 of the variable speed drive 13.

The variable speed driving mechanism as described is arranged so that when friction maintains 10% slip, no change occurs in the variable speed drive.

The reason for 10% slip is to make allowance for any difference in the diameter of the beam barrels which are seldom perfectly round, and also in case the spigots or bearings may be out of true.

The working of the variable speed driving mechanism applied to a beaming machine will now be described by way of example.

The drive to the beam shaft 22 from the variable speed drive 13 is transmitted through the hollow shaft 15 and thence by a 19 tooth sprocket wheel 16 to a 57 tooth sprocket wheel 18 on the driving side of the friction clutch 20.

On the driven member 21 of the friction clutch 20 and running at the same speed as the beam 23 is a 76 tooth sprocket wheel 25 which drives a 46 tooth sprocket wheel 28 on the counter-shaft 29 and thence, by reversing gears 30, 31 of equal size, drives the centre shaft 32 and the annulus 33 of the epicyclic gear train, the sun gear 24 of which is mounted on the hollow shaft 15 whereby the revolutions of the sun gear 24 are directly related with the revolutions of the driving side of the friction clutch 20.

While the 10% friction slip is maintained the sun gear 24 revolves in the opposite direction to, and at twice the speed, of the annulus 33, as the ratio of the sun gear 34 and the annulus 33 is 1 to 2 respectively, no movement of the planet wheel carrier 37 takes place.

As before stated, this carrier 37 is connected by a chain drive to the control screw 41 of the variable speed drive 13, which does not alter under the condition of 10% slip.

When, however, the drive side 21 of the friction clutch 20 slows down, due to increase in the diameter of the beam, the sun gear 24 is given a lead over the annulus 33, thereby causing the planet wheel carrier 37 to rotate and, through the chain 39 and sprocket wheels 38, 40, to alter the setting of the variable speed drive control screw 41, thereby slowing down the variable speed drive and restoring the 10% friction slip.

When the beam 23 is nearly fully wound, and only about 100 yards is left in the machine, the friction clutch 34 on the counter-shaft 29 which is driven by the hollow shaft 15 is brought into contact, by means of a handle 42, with the first of the reversing gear wheels 30, 31, thereby causing the centre shaft 32 to revolve at the same speed as the hollow shaft 15.

Owing to the difference in ratio between the sun gear and the annulus 33 of the epicyclic gear 25, the planet wheel carrier 37 is revolved at a fast rate in the opposite direction.

The variable speed control screw 41 revolves with the planet wheel carrier 37, and is thus re-set ready for the next running.

What I claim is:

1. Variable speed driving mechanism for beaming machines including an electromotor, a gear box, a variable speed drive in said box having an input shaft geared to the rotor shaft of said electromotor and an output shaft extending from the gear box, a hollow shaft mounted adjacent to the gear box having a gear wheel fixed thereto, a gear wheel on the output shaft of said variable speed drive enmeshed with the gear wheel fixed on said hollow shaft, a beam driving shaft, a friction clutch embodying driving and driven members, the driven member of said clutch being fast on the driving shaft of the beam, a sprocket wheel fast on said hollow shaft, a further sprocket wheel fast on the driving member of said friction clutch, a chain wrapping said sprocket wheels, an epicyclic gear train including a sun wheel fast on said hollow shaft, the revolutions of said sun wheel being directly related with the revolutions of the driving side of said friction clutch, a sprocket wheel fast on the driven member of said friction clutch and running at the same speed as the beam shaft, a countershaft adjacent to said hollow shaft, a sprocket wheel on said countershaft smaller than said sprocket wheel on the driven member, a chain wrapping said last-mentioned sprocket wheels, a friction clutch coupling on said countershaft, two meshing gear wheels of equal size respectively on said coupling and said hollow shaft, a center shaft journalled in the before-mentioned hollow shaft, two meshing gear wheels of equal size respectively fast on one end of said center shaft and fast with the sprocket wheel on the countershaft whereby the center shaft may be driven in reverse direction to the hollow shaft, said epicyclic gear train including an annulus and a planet wheel carrier, said center shaft having fast on its opposite end the annulus of the before-mentioned epicyclic gear train, a sprocket wheel on the planet wheel carrier of said epicyclic gear train, a control screw for the variable speed drive including a shaft extending from the gear box, a sprocket wheel fast on the shaft of the control screw of the variable speed drive, a chain wrapping said last-mentioned sprocket wheels, and means for moving the aforesaid friction clutch and friction clutch coupling respectively into and out of operation.

2. A variable speed driving mechanism as claimed in claim 1 characterized in that it is so arranged that when friction maintains 10% slip no change occurs in the variable speed drive, but when the driven side of the friction clutch on the beam shaft slows down due to increase in the diameter of the beam the epicyclic gear is operated to alter the setting of the variable speed drive control screw thereby slowing down the variable speed drive and restoring the 10% friction slip.

3. Variable speed driving mechanism as claimed in claim 1 further characterized in that when the beam is nearly fully wound, and only a certain predetermined number of yards, e. g., 100 yards, is left in the machine, the friction clutch coupling on the countershaft is brought into operation whereby to cause the centre shaft to revolve at the same speed as the hollow shaft, when owing to the difference in ratio between the sun gear and the annulus of the epicyclic gear the planet wheel carrier is revolved at a fast rate in the opposite direction whereby as the variable speed drive control screw revolves with the planet wheel carrier the said control screw is re-set ready for the next running.

GEORGE LEE.

References Cited in the file of this patent

UNITED STATES PATENTS

| Number | Name | Date |
|---|---|---|
| 2,142,544 | Whitener et al. | Jan. 3, 1939 |
| 2,243,795 | Eaddy | May 27, 1941 |
| 2,346,903 | Caffrey | Apr. 18, 1944 |
| 2,470,125 | Young | May 17, 1949 |
| 2,496,977 | Bechle | Feb. 7, 1950 |
| 2,522,559 | Bechle | Sept. 19, 1950 |
| 2,581,328 | Malcom | Jan. 1, 1952 |
| 2,608,741 | Reeves | Sept. 2, 1952 |

FOREIGN PATENTS

| Number | Country | Date |
|---|---|---|
| 176,111 | Switzerland | Mar. 31, 1935 |